Sept. 10, 1935.                G. D. BRADSTREET                2,014,125
                          ENCLOSED VEHICLE SPRING
                             Filed May 18, 1935
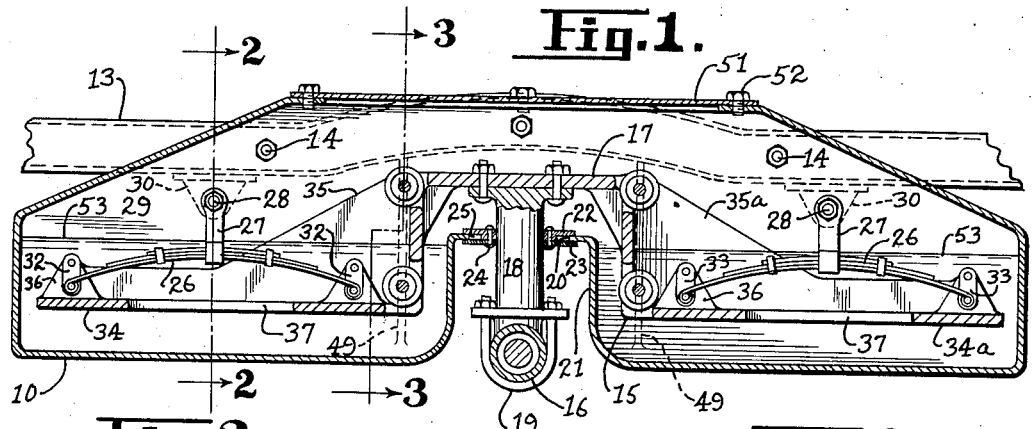
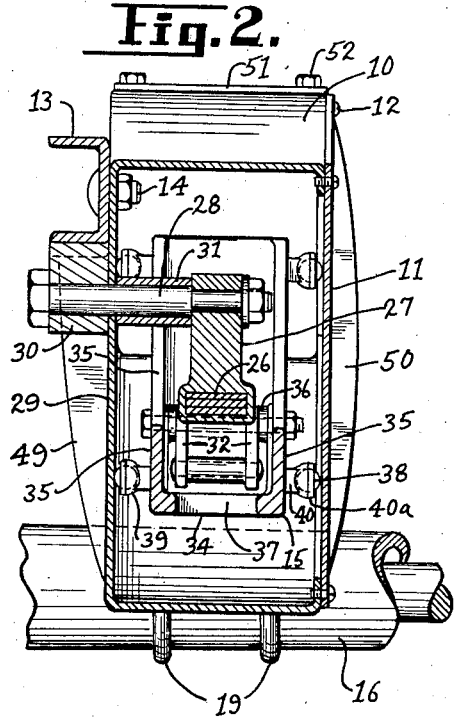 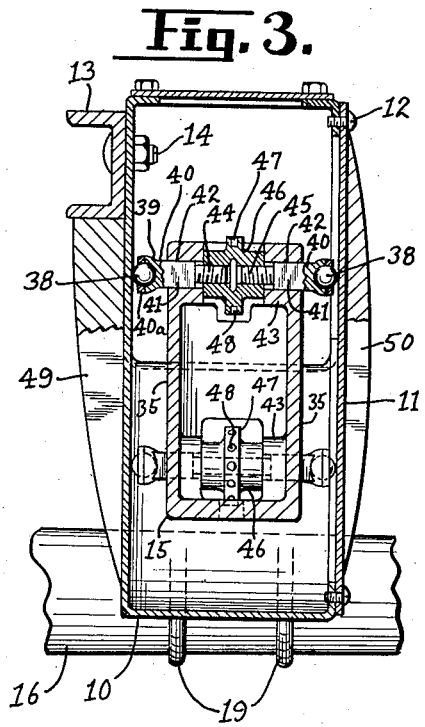
INVENTOR
*George D. Bradstreet.*
BY
*H. G. Manning*
ATTORNEY Patented Sept. 10, 1935

2,014,125

UNITED STATES PATENT OFFICE 2,014,125

ENCLOSED VEHICLE SPRING

George Dudley Bradstreet, Thomaston, Conn.

Application May 18, 1935, Serial No. 22,151

10 Claims. (Cl. 267—36)

This invention relates to spring suspensions for vehicles, and more particularly to the use of a pair of semi-elliptical springs supported upon a platform located above each axle entirely enclosed within a sealed casing containing lubricant.

One object of the invention is to provide a spring suspension of the above nature in which the opposite ends of the semi-elliptical springs are connected to shackle bearings mounted on the supporting platform, which in turn is rigidly supported by the axle.

A further object is to provide a vehicle spring suspension of the above nature in which the casing is connected to the chassis frame, and the spring supporting platform is provided with rotary bearings which are adapted to engage the side walls of said casing whereby relative angular movement between said casing and frame will be prevented and swaying forces exerted at one side of the vehicle will be partially transmitted to the spring suspension unit on the opposite side and rocking of the car will thus be diminished.

A further object is to provide a spring suspension of the above nature which will be simple in construction, inexpensive to manufacture, easy to install, compact, and very efficient and durable in use.

With these and other objects in view, there has been illustrated on the accompanying drawing one form in which the invention may be conveniently embodied in practice.

In the drawing:

Fig. 1 represents a vertical longitudinal sectional view through the spring suspension unit.

Fig. 2 is a vertical transverse sectional view of the same on an enlarged scale, taken along the line 2—2 of Fig. 1, looking in the direction of the arrows.

Fig. 3 is a similar view taken along the line 3—3 of Fig. 1, looking in the direction of the arrows.

Referring now to the drawing in which like reference numerals denote corresponding parts throughout the several views, the numeral 10 indicates a casing having a front wall 11 which is detachably secured thereto as by screws 12. The casing 10 is made secure to the chassis frame 13 of a vehicle by means of bolts 14.

The interior of the casing 10 is provided with a "floating" spring supporting frame 15, the central portion of which frame 15 is provided with an inverted U-shaped section 17 which is rigidly joined, as by bolts, to the upper flanged end of a cylindrical pedestal 18 fastened securely to the axle housing 16 by means of a pair of U-shaped bolt clips 19. The pedestal 18 extends through a circular opening 20 formed in the top of a tubular raised section 21 provided integral with the casing 10. A substantially liquid-tight seal is provided between the pedestal 18 and the opening 20 by means of a pair of spaced annular plates 22 and 23 secured together by rivets 24 and a circumferential groove 25 being provided therebetween to permit relative lateral movement of the casing 10.

In order to produce a resilient connection between the axle housing 16 and the frame 13, provision is made of a pair of upwardly convex semi-elliptical springs 26, 26. The springs 26, 26 are secured at their central apexes to clip members 27, 27, the upper ends of which embrace the inner ends of a pair of horizontal bolts 28 passing through the rear wall 29 of the casing 10. The outer ends of said bolts 28 are mounted in a pair of brackets 30 rigidly secured to the underside of the chassis frame 13, see Figs. 1 and 2. Each clip member 27, 27 is held properly spaced from the rear wall 29 of the casing 10 by means of a horizontal sleeve member 31 fitting over the bolt 28.

The lower free ends of the elliptical springs 26, 26 are adapted to be pivotally supported by a pair of vertical shackle links 32, 33 upon a pair of oppositely extending platforms 34, 34a forming an integral part of the spring supporting frame 15, said platforms being suitably reinforced by a pair of vertical side ribs 35, 35a. The shackle links 32, 33 have their upper ends pivotally connected to embossed portions 36 forming an integral part of the ribs 35, 35a. As shown in Fig. 1, the intermediate portions of the platforms 34, 34a are provided with cut-out sections 37 to prevent the spring clip members 27 from striking said platform in case of severe downward jolts of the vehicle.

It will be understood that the casing 10 is secured rigidly to the frame 13 of the car, while the spring supporting frame 15 is rigidly secured to the axle housing 16.

In order to permit a slight longitudinal motion of the frame 15 with respect to the casing 10, and also permit said frame to move vertically within said casing 10, provision is made of a plurality of ball-bearings 38—eight in this instance—carried by the sides of said frame 15, said ball-bearings being adapted to engage the adjacent inner walls of said casing 10. As most clearly shown in Figs. 2 and 3, the ball-bearings 38 are mounted in sockets 39 provided in the outer ends of eight horizontally movable holder blocks 40. The ball-bearings 38 are held in their respective sockets 39 by means of retaining rings 40a. The brackets 40 are preferably provided with squared shanks 41 fitting into correspondingly shaped horizontal alined apertures 42 provided in enlarged inwardly extending bosses 43 formed in opposite corners of the central U-shaped section 17 of the frame 13. The two upper and lower adjacent alined bearing shanks 41 are provided with right and left-hand screw studs 44 and 45, respectively, which engage in a pair of special central nuts 46, 46 having tapped holes for receiving the same. The nuts 46, 46 are provided with annular intermediate flanges 47, in the outer circumference of which are located a series of radial holes 48, by means of which a pin wrench or similar tool may be employed for turning the nut and thus adjusting the blocks 40 in the desired direction.

To reinforce the portion of the casing 10 outside the vertical path of the ball-bearings 38, provision is made of a pair of vertical ribs 49 formed integral with the outside of the rear wall 29 of the casing 10, and a similar pair of ribs 50 are on the outside of the removable front wall 11. This construction greatly strengthens the casing and prevents the side walls from bulging or cracking under the pressure of the ball-bearings 38.

The upper end of the casing 10 is preferably apertured and sealed by a detachable cover plate 51 attached as by screws 52, and said plate may be removed from time to time to permit adjustments and to supply oil which preferably should be maintained at the level 53 in the casing 10.

It is to be noted that in the operation of the invention, due to the fact that the spring housing is rigidly secured to the chassis and that no relative angular motion is permitted between said housing and the spring supporting platform, excessive swaying jolts exerted upon one of the spring suspension units will in some measure be transmitted through the chassis to the opposite spring suspension unit, and side swaying and rocking of the vehicle will thereby be greatly reduced.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a spring suspension apparatus for a vehicle, a hollow casing attached to the chassis frame of said vehicle, a spring supporting member located in said casing, means extending through said casing for rigidly connecting said member with the axle of said vehicle, and spring means for connecting said member with said chassis frame.

2. In a spring suspension apparatus for a vehicle, a hollow casing attached to the chassis frame of said vehicle, a spring supporting member located in said casing, means extending through said casing for rigidly connecting said member with the axle of said vehicle, spring means for connecting said member with said chassis frame, and bearing means on the sides of said member for engaging the side walls of said casing and guiding said member therewithin.

3. In a spring suspension apparatus for a vehicle frame, a hollow casing attached to said frame, a double spring platform member located in said casing, means for rigidly supporting said platform member upon the running gear of said vehicle, and a pair of semi-elliptical springs for resiliently connecting said platform and said vehicle frame.

4. In a spring suspension apparatus for a vehicle frame, a hollow casing attached to said frame, a double spring platform member located in said casing, means for rigidly supporting said platform member upon the running gear of said vehicle, and a pair of semi-elliptical springs for resiliently connecting said platform and said vehicle frame, said casing containing a supply of lubricant covering said springs.

5. In a spring suspension apparatus for a vehicle frame, a hollow casing carried by said frame, a supporting platform located in said casing, a depending pedestal extending from said platform down through said casing and supported upon the axle of said vehicle, said platform being resiliently connected to said vehicle frame in front of and behind said pedestal.

6. In a spring suspension apparatus for a vehicle frame, a hollow casing carried by said frame, the bottom of said casing having an offset raised section embracing the axle of said vehicle, a spring supporting member in said casing having an upwardly offset intermediate section embracing the offset section of said casing, said member having a pair of oppositely extending horizontal platforms, means extending through the offset section of said casing for connecting said member rigidly with the axle housing, and a pair of upwardly bowed semi-elliptical springs rigidly secured at their tops to said frame, the free ends of said springs being connected with said platforms.

7. In a spring suspension apparatus for a vehicle frame, a hollow casing attached to said frame, a double spring platform member located in said casing, means for rigidly supporting said platform member upon the running gear of said vehicle, a pair of semi-elliptical springs for resiliently connecting said platform and said vehicle frame, and a plurality of ball-bearings carried by said platform member for engaging the opposite side walls of said casing for preventing transverse angular movement between said member and said casing.

8. In a spring suspension apparatus for a vehicle, a hollow casing carried by the chassis frame of said vehicle, a platform member located in said casing and having rigid connection with the axle housing of said vehicle, spring means connecting said platform with said frame, a plurality of opposed rotary bearings carried by the sides of said platform member for engaging the side walls of said casing to prevent relative transverse movement between said casing and said frame.

9. In a spring suspension apparatus for a vehicle, a hollow casing carried by the chassis frame of said vehicle, a platform member located in said casing and having rigid connection with the axle housing of said vehicle, spring means connecting said platform with said frame, a plurality of opposed rotary bearings carried by the sides of said platform member for engaging the side walls of said casing to prevent relative transverse movement between said casing and said frame, and means for adjusting the pressure of said bearings upon the walls of said casing.

10. In a spring suspension apparatus, a frame, a hollow casing attached to said frame, a double spring platform member located in said casing, means for connecting said platform member with a supporting member, and a pair of springs for resiliently connecting said platform and said frame.

GEORGE DUDLEY BRADSTREET.